United States Patent [19]
Grube et al.

[11] Patent Number: 6,157,829
[45] Date of Patent: Dec. 5, 2000

[54] METHOD OF PROVIDING TEMPORARY ACCESS OF A CALLING UNIT TO AN ANONYMOUS UNIT

[75] Inventors: Gary W. Grube, Barrington; Ronald Thomas Crocker, St. Charles, both of Ill.

[73] Assignee: Motorola, Inc., Schaumburg, Ill.

[21] Appl. No.: 08/946,996

[22] Filed: Oct. 8, 1997

[51] Int. Cl.[7] .................................................. H04Q 7/38
[52] U.S. Cl. .......................................... 455/414; 379/213
[58] Field of Search ..................................... 455/410, 411, 455/406, 414, 415, 417, 445; 379/67.1, 142, 88.19, 88.2

[56] References Cited

U.S. PATENT DOCUMENTS

| | | | |
|---|---|---|---|
| 5,014,345 | 5/1991 | Comroe et al. | 455/68 |
| 5,058,152 | 10/1991 | Solomon et al. | 379/67 |
| 5,274,699 | 12/1993 | Ranz | 379/142 |
| 5,504,933 | 4/1996 | Saito | 455/3 |
| 5,511,111 | 4/1996 | Serbetcioglu et al. | 379/67 |

*Primary Examiner*—Edward F. Urban
*Attorney, Agent, or Firm*—Steven R. Santema

[57] ABSTRACT

A method is provided of establishing a direct communication session by a central service agent between a calling unit and an anonymous unit without revealing the permanent direct access information of the anonymous unit to a calling member. The central service agent is configured to be able to identify a request by a calling member, associated with the calling unit, for future access to a called member associated with the anonymous unit, where the permanent direct access information of the anonymous unit is unknown to the calling member. Once the request is received, the agent assigns a temporary alias ID corresponding, on a temporary basis, to the permanent direct access information of the anonymous unit to facilitate establishing a direct communication session between the calling and anonymous units using at least the temporary alias ID. Upon the occurrence of a predetermined timeout condition, the agent deassigns the temporary alias to prevent further access to the anonymous unit thereafter. In an alternative embodiment, the real and permanent ID is communicated, on a temporary basis, to a specific calling unit, transparent to the caller, thus maintaining anonymity.

20 Claims, 1 Drawing Sheet

METHOD OF PROVIDING TEMPORARY ACCESS OF A CALLING UNIT TO AN ANONYMOUS UNIT

FIELD OF THE INVENTION

The present invention relates generally to radio communications systems, and more particularly to establishing access between communication devices.

BACKGROUND OF THE INVENTION

People are often wary of giving out their "real name," as it opens up too much opportunity for abuse. Examples of real names include home phone numbers, cellular phone numbers, or paging Personal Identification Numbers (PINs). Inherent in this is the problem associated with giving out a permanent name for associations that are temporary in nature. For example, consider the case of a limousine company and their drivers and customers. The customer contacts the dispatcher to request service. The company dispatcher communicates requests for service from customers to drivers, along with communicating specific information about the driver to the customer—the type and color of car, a designated meeting place, and the driver's name. The car itself may contain a mobile phone, pager or facsimile machine, but the company dispatcher would be wary of giving out the direct number to the car because the customers and the drivers might short-cut the dispatchers to negotiate outside the system. But, as a customer, one would be interested in having the direct number to the car to communicate with the driver to better arrange the connection. This is a problem today.

A similar problem arises anytime a dispatcher or the receiving party of a message or call wishes for whatever reason to keep private the number or address where one might be reached. For example, consider the analogous scenario where a mail order customer wishes to have a mail order form sent via email address but does not want to have that email address given out for fear of being inundated with junk mail in the future.

It would be greatly advantageous to provide a service, requiring little or no human interaction, for establishing a communication link between a caller and the intended recipient of a call, on a temporary basis, so that the caller is discouraged or actually prevented from contacting the intended recipient in the future.

Call forwarding by a message service clearly does not solve the problem of eliminating the opportunity of the caller to even leave a message for a called party, who in the call forwarding scenario, may choose to ignore the message, but will nonetheless receive it. In call forwarding, it is not that the caller does not have the right number, but that it can't, because of the intercepting party or service, get through. A caller can still be a nuisance if he so desires, by continuing to leave messages with the service, under either his real name or an assumed name.

Solutions for maintaining privacy or restricting access to records or the like material is well known. For example, it is common for today's larger companies to make arrangements with a vendor to allow an interested party, such as a loan mortgage company, to dial up a number and request to receive, for example by mail or facsimile, a mortgage applicant's employment data (salary, title, years of employment, etc.) simply using an employee provided "single-use" PIN number. The process requires no human intervention whatsoever, made possible by conventional interactive voice recognition (IVR) processing, and can even be set up such that the party requesting the information is billed for the service. The employee merely has to request a PIN number from the vendor, which he/she could do by placing a phone call to an automated PIN number provider, and which he/she provides to the interested party, together with the number to call for requesting the employee information. The rest is up to the caller, i.e., the mortgage company.

Another example is the popular "pay-per-view" programming facilitated by cable and satellite programming stations. In this regard, a viewer's access to scrambled signals is restricted to maintain privacy over the signals, unless payment is received for the right to view a desired program. Limited unrestricted access, and on a temporary basis, to the unscrambled signal or signals is possible. The viewer places a call to the programming station requesting—via automated touch-pad processing, IVR, or the like—access to a certain pay-per-view program. The programming station, in turn, transmits a signal to the viewer's home box which is used by the box to descramble, on a temporary basis, the incoming pay-per-view program. When the program ends, the descrambling code expires so as not to allow further descrambling of incoming signals. The viewer is then charged for that right to have viewed the unscrambled program.

The problem solved by the above solutions to the problem of maintaining privacy over records and cable programming, however, is altogether different from the problem of preserving the anonymity of a called party's device associated with a party that a caller wishes to send a communication to, or establish a communication link with, on a temporary basis only.

A solution is desirable which solves the problem of preserving the anonymity of a called party's device associated with a party that a caller wishes to send a communication to, or establish a communication link with, on a temporary basis only with minimum and preferably no human intervention whatsoever.

DETAILED DESCRIPTION OF THE PREFERRED EMBODIMENTS

Generally, the present invention is directed to a method of establishing a direct communication session by a central service agent between a calling unit and an anonymous unit without revealing the permanent direct access information of the anonymous unit to a calling member. The central service agent is configured to be able to identify a request by a calling member, associated with the calling unit, for future access to a called member associated with the anonymous unit, where the permanent direct access information of the anonymous unit is unknown to the calling member. Once the request is received, the agent assigns a temporary alias ID corresponding, on a temporary basis, to the permanent direct access information of the anonymous unit to facilitate establishing a direct communication session between the calling and anonymous units using at least the temporary alias ID. Upon the occurrence of a predetermined timeout condition, the agent deassigns the temporary alias to prevent further access to the anonymous unit thereafter.

In an alternative embodiment, the real and permanent ID of the anonymous unit is communicated, on a temporary basis, to a specific calling unit, transparent to the caller, thus maintaining anonymity.

The present invention can be more fully described with reference to FIGS. 1–2.

Figure 1:
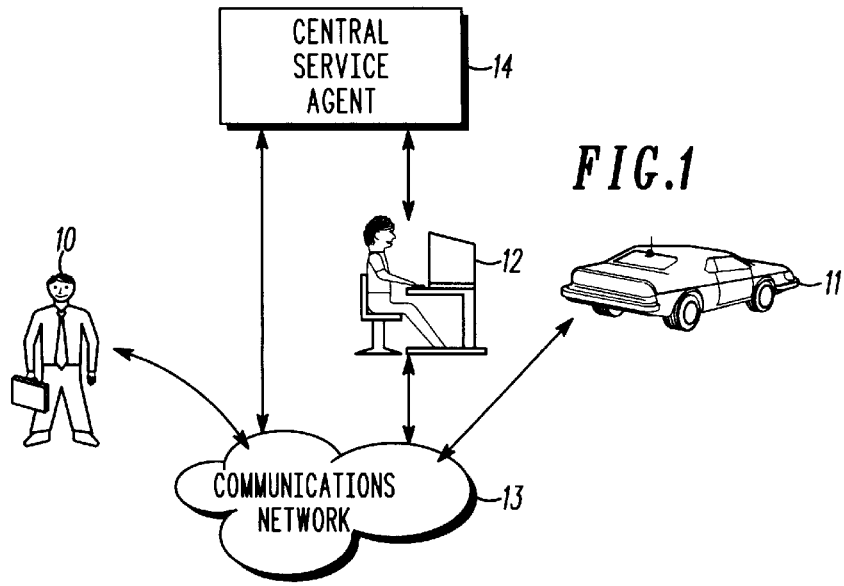
FIG. 1 is an exemplary application of the present invention in the context of a customer wishing to contact a limousine.
Figure 2:
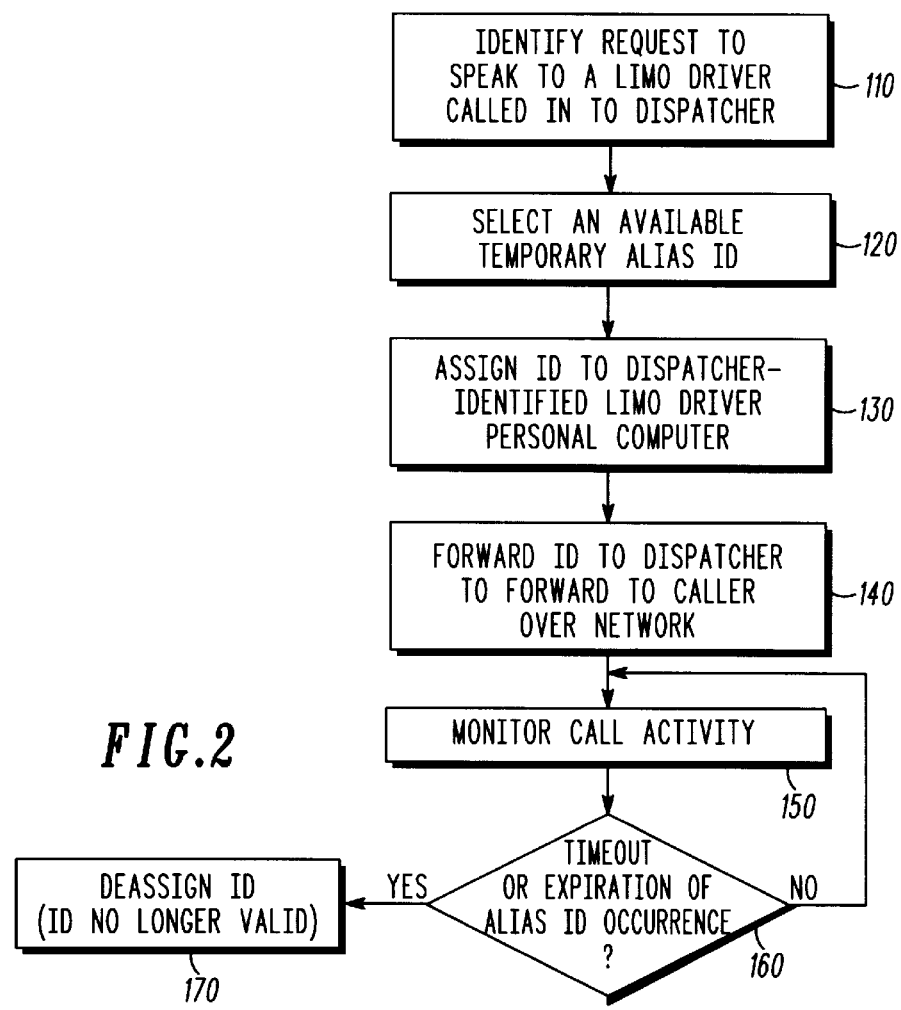
FIG. 2 is a flow chart showing the operational flow of the invention in accordance with a first preferred embodiment.

FIG. 1 is an exemplary application of the present invention in the context of a customer 10 wishing to contact a limousine 11. Customer 10 first contacts the dispatcher 12 to request service. The dispatcher then communicates requests for service, over a dispatch trunking communications network 13, from customer 10 to the driver (not shown) of limousine 11. In accordance with the present invention, once a driver has been identified who can carry out the customer's needs for service, the dispatcher then negotiates an available temporary alias ID from a central service agent 14, and returns this number to the customer 10 along with other information (color of the car, drivers name, time of arrival, etc.).

The objective is that the customer 10 can use this number for a predetermined period of time to contact the limousine 11 driver. When the customer 10 calls the temporary alias ID, the central service agent 14 confirms that the number is a presently assigned number and then forwards the call to the real number corresponding to the temporary alias ID. The temporary alias ID is temporary, as is the nature of relationship between driver and customer 10. As such, the temporary alias ID can be set to expire within a given time (two hours or two days), or after a certain number of uses (three (3) calls). The end result is that the customer 10 is now able to safely communicate with the driver and without being able to bypass the dispatcher, because he needs the dispatcher to provide him with the temporary alias ID (assigned by the central service agent) necessary to contact the driver. After the temporary alias ID expires, the customer 10 will be unable to access the driver directly, since the driver's mobile phone number remains anonymous.

The above scenario is presented as a specific application employing the present invention. It should be appreciated that the invention may be employed under many different applications where anonymity of the called device associated with a called party needs to be preserved. A first preferred embodiment of the present invention will be described more generally with reference to the flow chart in FIG. 2.

The central service agent 14 is configured to identify requests for a temporary alias ID and to act on that request (step 110). In the customer-driver exemplary scenario presented above, the request for an ID comes from the dispatcher 12. It should be readily apparent, however, that the functionality of the central service agent 14 could be a separate service, separate and apart from the dispatcher network 13, or it may be configured as an integral part thereof. In the latter instance, rather than communicate with the dispatcher 12 directly, the caller may instead interface directly with the central service agent 14. The agent 14 could select (120) and assign available (non-assigned) temporary alias IDs in response to dispatcher-identified limousine 11 driver direct access information to his personal communicator (the anonymous unit) (130). The agent 14 would then forward the assigned temporary alias ID information to the dispatcher (140) so the dispatcher 12 can forward it on to the customer 10 over the network 13. The central service agent 14 may alternatively be configured instead to recognize and respond to voice activated commands as is conventional with interactive voice recognition (IVR) processing, or in response to keypad entries at the caller's calling unit, so as to select, and assign an appropriate number. Alternatively, it is further contemplated that the caller may also be able to dial in by computer (e.g., by modem, email, etc.) his request for access to a certain identified individual or request for service.

The central service agent 14 could then inform the communication network of the assignment or it may be configured to monitor call activity requests from the network 13 (150). For example, when the network 13 receives a call using the temporary alias ID, the network 13 will query the central service agent 14 for the corresponding real number assignment. Of course, if the central service agent 14 and network 13 are one and the same, then the network 13 need only access the appropriate database of temporary alias IDs to confirm that the call should be put through and automatically establish the communication session or link to the corresponding anonymous device (160), and if not valid, to not establish the communication session, prompting the caller that the number is no longer a valid number (170).

The assignment of a temporary alias ID to the user by the central service agent 14 may be a relatively simple task (central service agent 14 picks the next available number from a pool of numbers, all of which have the same timeout/expiration conditions) or may be more involved. For example, the timeout conditions may be a function of the type of session that is requested by the customer (caller). In this regard, if the central service agent 14 is asked to assign a temporary number so the caller can send a facsimile to John Doe sometime in the next two hours, the expiration period of the ID may be set to dynamically expire after two hours, or three facsimile attempts, whichever occurs first. Alternatively, the central service agent 14 may also be set up to cause the ID to expire if the facsimile exceeds a predetermined number of pages faxed (so as to avoid tying up the receiving device).

Similarly, if the assignment is to a temporary pager provided to employees who forget their pagers for example, then the assignment of the ID might be selectively determined on the basis of an employee's work-shift (nine-to-five).

It is envisioned that the party or device wishing to maintain anonymity may be able to dynamically set the timeout conditions of the temporary number assignment services requested, and by the same token, to enable or disable use of the service on demand.

It is further envisioned that the central service agent 14 may be an independent network configured to communicate with a variety of communication networks, including a telephony network (wireless and/or wireline), a trunked communications system network, a paging network, and a computer-to-computer type network (e.g., the internet). The area of multi-network configurations is well established in the art of radio and network communications and not a part of this invention. In a multi-network arrangement, a central service agent 14 could be provided to facilitate assignment of temporary alias IDs regardless of the desired type of user-to-user communication, so long as the purpose of the assignment is on a temporary basis.

There are inherently other benefits to the present invention. For example, if an individual desires to receive email messages from a certain person that she may have come in contact with at a bar, but wants to get to know that person better before giving out her real email address, this invention would allow her to give out a temporary alias ID associated with her real email address. The temporary email address is good for a limited time, which limited time can be extended or canceled by her on demand. The central service agent 14 would make such a service possible, and preferably in an entirely automated process.

The central service agent 14 may also allow for assigning a temporary unique PIN number, instead of a phone number to the caller. The caller is instructed to call a certain fixed number, and then to enter (e.g., by voice or keypad activation) the PIN number as prompted, for the communication session to be established. This similar practice is employed in many paging systems today, including the SKYTEL paging network.

A possible business scenario could also be envisioned where an entity may wish to keep anonymous the domain name of its web site, but to allow limited access thereto and for limited purposes, under the guide of the central service agent 14 approach contemplated by the present invention.

To ensure availability of a suitable pool of temporary ID numbers, a number of unique ID assignment schemes are possible.

For example, if Jill wishes not to give her real number to Jack for now, she could ask Jack for his. Jack's number, together with a PIN number selected by the central service agent 14 server or by Jill herself, might form the basis of the temporary alias ID necessary for Jack to establish a direct communication with Jane during a set period. The assigned number could also be selected on the basis of the number belonging to the anonymous unit, e.g., the permanent phone number might be issued in a randomly scrambled form.

With a lot of resources requesting use of the temporary alias ID services provided by an integrated central service agent, particularly in a multi-network environment, it should be appreciated that the central service agent 14 must maintain a database to appropriately coordinate intersystem incompatibilities. For example, communication sessions to be established anonymously may be mobile-to-mobile, phone-to-phone, phone-to-pager, phone-to-facsimile, computer-to-computer (email), etc. The central service agent 14 and network environment(s) must be configured to handle all the different possible call setups contemplated by the present invention: phone, PIN, address, and the like assignments.

In an alternative embodiment, it is envisioned that the central service agent 14 is configured to secretly (secret to the caller) assign the real and permanent ID of the anonymous unit, instead of a temporary alias ID. This is particularly relevant in digital wireless services, but may implemented in other services as well, including wireline telephony equipment. In this alternative embodiment, a closed or "secret" approach is used to facilitate maintaining anonymity. Using the dispatcher example of FIG. 1, in a secret approach, the central service agent 14 would respond to the request for an anonymous communication session by a calling unit, by downloading the permanent ID of the anonymous unit directly into the calling unit as an embedded function. So long as a set timeout/expiration condition has not yet occurred, the calling unit will be allowed to establish a communication session with the anonymous unit, much the same as with the temporary alias ID. Because the calling unit, and not the caller, has access to the permanent ID, the permanent ID remains anonymous. The calling unit may be provided with functionality that erases (makes inaccessible) the permanent ID after the expired period or condition, but the central service agent 14 (or network) may also be configured to handle such a task.

The functionality and multi-network communications described above in connection with the first embodiment are equally pertinent in the "secret" approach.

While the present invention has been particularly shown and described with reference to particular embodiments thereof, it will be understood by those skilled in the art that various changes in form and details may be made therein without departing from the spirit and scope of the present invention.

We claim:

1. A method of establishing a direct communication session by a central service agent between a calling unit and an anonymous unit without revealing the permanent direct access information of the anonymous unit to a calling member, the method comprising the central service agent performed steps of:

identifying a request by a calling member associated with the calling unit, for future access to a called member associated with the anonymous unit, where the permanent direct access information of the anonymous unit is unknown to the calling member;

assigning, in response to the request a temporary alias ID and a timeout condition, the temporary alias ID corresponding, on a temporary basis, to the permanent direct access information of the anonymous unit to facilitate establishing a direct communication session between the calling and anonymous units using at least the temporary alias ID; and deassigning the temporary alias ID upon the occurrence of the timeout condition to prevent further access to the anonymous unit via the temporary alias ID.

2. The method of claim 1, wherein the timeout condition is timebased, the central service agent terminating the direct communication session after a set time lapses.

3. The method of claim 1, wherein the timeout condition is timebased, the central service agent preventing the calling member from establishing the direct communication and any subsequent direct communication sessions, using the temporary alias ID, after a set time lapses.

4. The method of claim 1, wherein the timeout condition is call based, the central service agent preventing the direct communication session and any subsequent direct communication sessions, using the temporary alias ID, after a set number of calls.

5. The method of claim 1, wherein the direct access information includes at least one of: a unique ID associated with the anonymous unit belonging to the called member, a phone number associated with the anonymous unit belonging to the called member, an assigned access frequency associated with the anonymous unit belonging to the called member, mode information unique to the called member assigned the anonymous unit, access instructions specific to the anonymous unit belonging to the called member, an email address associated with the called member, a facsimile number associated with the anonymous unit belonging to the called member, a pager number associated with the anonymous unit belonging to the called member, and a web site associated with the anonymous unit belonging to the called member.

6. The method of claim 1, further comprising the steps of:

communicating the temporary alias ID to the calling member to facilitate the calling member using the temporary alias ID at a future time to establish the direct communication session.

7. The method of claim 6, further comprising the steps of:

detecting a request from the calling unit, using a currently active temporary alias ID, for establishing the direct communication session; and establishing the direct communication session in response to the temporary alias ID and a permanent ID of the calling unit.

8. The method of claim 6, wherein said central service agent includes an interactive voice recognition system, and wherein the step of assigning the temporary alias ID includes the steps of:

the interactive voice recognition system interpreting voice instructions from the calling member, and automatically assigning, in response thereto, the temporary alias ID.

9. The method of claim 1, further comprising the steps of:

detecting a request from a communication network for direct access information of an anonymous unit associated with a temporary alias ID transmitted by a calling unit attempting to establish a direct communication session;

when the transmitted temporary alias ID is currently active, forwarding the direct access information of the corresponding anonymous unit to the communication network; and when the transmitted temporary alias ID has expired or not previously assigned, not forwarding any direct access information.

10. The method of claim 9, wherein said central service agent includes an interactive voice recognition system, and wherein the step of assigning the temporary alias ID includes the steps of:

the interactive voice recognition system interpreting voice instructions from the calling member, and automatically assigning, in response thereto, the temporary alias ID.

11. The method of claim 9, wherein said communication network is at least one of a telephony system network, a trunked communications system network, a paging network, and a computer-to-computer type network.

12. The method of claim 1, wherein said direct communication session is a two-way session.

13. The method of claim 1, wherein said direct communication session is a one-way session.

14. The method of claim 1, whereby the step of assigning a temporary alias ID includes the step of maintaining an ID assignment database for billing purposes.

15. A method of establishing a direct communication session by a central service agent between a calling unit and an anonymous unit without revealing the permanent ID of the anonymous unit to a calling member, the method comprising the central service agent performed steps of:

identifying a request by a calling unit for future access to a called member associated with the anonymous unit, where the permanent ID of the anonymous unit is unknown to the calling member; and communicating at least the permanent ID of the anonymous unit to the calling unit to facilitate establishing, on a temporary basis, a direct communication session between the calling and anonymous units, and without communicating the permanent ID to the calling member.

16. The method of claim 15, wherein said temporary basis is a function of a timebased timeout condition, the central service agent terminating any currently established direct communication session after a set time lapses.

17. The method of claim 15, wherein said temporary basis is a function of a timebased timeout condition, the central service agent preventing the calling unit from establishing the direct communication and any subsequent direct communication sessions, using the permanent ID, after a set time lapses.

18. The method of claim 15, wherein said central service agent includes an interactive voice recognition system, and wherein the step of communicating the permanent ID includes the steps of:

the interactive voice recognition system interpreting voice instructions from a calling member talking on the calling unit, and automatically downloading to the calling unit, in response to the voice instructions, at least the permanent ID of the anonymous unit with which the calling member desires to speak.

19. The method of claim 15, wherein the step of communicating at least the permanent ID of the anonymous unit to the calling unit to facilitate establishing, on a temporary basis, a direct communication session includes also communicating timeout information, in response to which access to the permanent ID stored in the calling unit is disabled by the calling unit.

20. The method of claim 19, wherein the step of communicating at least the permanent ID of the anonymous unit to the calling unit to facilitate establishing, on a temporary basis, a direct communication session includes also communicating network access information.

* * * * *